United States Patent
Geeurickx et al.

(10) Patent No.: US 10,023,663 B2
(45) Date of Patent: Jul. 17, 2018

(54) PROPYLENE POLYMER FOR HIGH-TENACITY FIBERS AND NONWOVENS

(71) Applicant: TOTAL RESEARCH & TECHNOLOGY FELUY, Seneffe (BE)

(72) Inventors: Peter Geeurickx, Dilbeek (BE); Alain Standaert, Brussels (BE); Jean-Luc Zuliani, Genappe (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 728 days.

(21) Appl. No.: 14/411,250

(22) PCT Filed: Jun. 27, 2013

(86) PCT No.: PCT/EP2013/063460
§ 371 (c)(1),
(2) Date: Dec. 24, 2014

(87) PCT Pub. No.: WO2014/001426
PCT Pub. Date: Jan. 3, 2014

(65) Prior Publication Data
US 2015/0140887 A1 May 21, 2015

(30) Foreign Application Priority Data

Jun. 27, 2012 (EP) ..................................... 12173766

(51) Int. Cl.
*C08F 10/06* (2006.01)
*D01D 5/12* (2006.01)
*D01D 10/02* (2006.01)
*D01F 6/06* (2006.01)
*B29C 47/00* (2006.01)
*D01F 6/30* (2006.01)
*B29K 23/00* (2006.01)
*B29L 31/00* (2006.01)

(52) U.S. Cl.
CPC .......... *C08F 10/06* (2013.01); *B29C 47/0014* (2013.01); *D01D 5/12* (2013.01); *D01D 10/02* (2013.01); *D01F 6/06* (2013.01); *D01F 6/30* (2013.01); *B29K 2023/14* (2013.01); *B29L 2031/731* (2013.01); *Y10T 442/60* (2015.04)

(58) Field of Classification Search
CPC .......... C08F 10/06; D01D 5/12; D01D 10/02; D01F 6/06; D01F 6/30; B29C 47/0014; B29K 2023/731; B29L 2013/731; Y10T 442/60
See application file for complete search history.

(56) References Cited

U.S. PATENT DOCUMENTS

| 7,674,731 B2 * | 3/2010 | Marzolla | C08F 210/06 428/296.7 |
| 2011/0184136 A1 * | 7/2011 | Haubruge | D01F 6/06 526/135 |

FOREIGN PATENT DOCUMENTS

| EP | 0361493 A1 | 4/1990 |
| EP | 0728769 A1 | 8/1996 |
| EP | 2070956 A1 | 6/2009 |
| EP | 2305723 A1 | 4/2011 |

OTHER PUBLICATIONS

G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, n° 4, Jul.-Aug. 1977, p. 773-778.
2nd World Congress of Chemical Engineering, Montreal, Canada, 6, 373 (Oct. 4-9, 1981).
Plastics Additives Handbook, ed. H. Zweifel, 5th edition, 2005, Hanser Publishers.
Polypropylene Handbook, ed. Nello Pasquini, 2nd edition, Hanser, 2005, pp. 397-403.
International Search Report issued in International Application No. PCT/EP2013/063460, dated Jul. 26, 2013 (3 pages).

* cited by examiner

*Primary Examiner* — Cephia D Toomer
(74) *Attorney, Agent, or Firm* — Albert Shung

(57) ABSTRACT

Propylene polymers having a melt flow index in the range from 3.0 dg/min to 8.0 dg/min can be particularly suited for high-tenacity fibers and yarns and nonwovens. The propylene polymers can be produced by a process that includes polymerizing propylene or propylene and at least one comonomer in presence of a Ziegler-Natta polymerization catalyst, an aluminium alkyl, and hydrogen.

17 Claims, No Drawings

PROPYLENE POLYMER FOR HIGH-TENACITY FIBERS AND NONWOVENS

CROSS REFERENCE TO RELATED APPLICATIONS

This application is a National Stage Entry of PCT/EP2013/063460, filed on Jun. 27, 2013, which claims priority to EP 12173766.2, filed on Jun. 27, 2012.

FIELD OF THE INVENTION

The present invention relates to propylene polymers having a melt flow index in the range from 3.0 dg/min to 8.0 dg/min that are particularly suited for high-tenacity fibers and yarns and nonwovens. The present invention also relates to a process for the production of such propylene polymers.

THE TECHNICAL PROBLEM AND THE PRIOR ART

The combination of mechanical and physical properties together with good processability and good economics have made polypropylene the material of choice for a large number of fiber and nonwoven applications, such as for articles in construction and agriculture, sanitary and medical articles, carpets, textiles. In recent years high-tenacity fibers and nonwovens for use for example in agriculture or in the automotive industry are one of the applications that have attracted special attention. In general, high-tenacity fibers can be defined as having a tenacity of at least 45 cN/tex.

Depending upon the desired final properties of the fibers and nonwovens and the processing methods used in their production the requirements of the polypropylene, for example the melt flow index, can differ widely. The polypropylenes used for fibers and nonwovens generally have a melt flow index in the range from 3 dg/min for very strong high-tenacity fibers up to several thousand dg/min for melt-blown nonwovens.

High-tenacity fibers may be produced by melting a polypropylene in an extruder and extruding the molten polypropylene through the fine capillaries of a spinneret to obtain filaments. These filaments are then cooled and thus solidified. In order to increase the tenacity, the solidified fibers are reheated, drawn at elevated temperature and finally annealed. In general it is observed that the tenacity of the fibers increases with increasing draw ratio. However, the increase in tenacity is accompanied by a decrease in elongation. This leads to fibers that have a high tenacity but because of being too rigid are unable to absorb energy and therefore tend to break easily. To avoid these problems desirable fibers should have a tenacity at max of 45 cN/tex or higher and an elongation at break of 55% or more, better of 65% or more, in order to be well suited for high tenacity fibers and nonwovens.

So as to either allow further increases in fiber tenacity and in consequence either allow for stronger nonwovens or nonwovens having reduced weight while keeping the same performance, there is an interest in having improved propylene polymers suitable for the production of such high-tenacity fibers. It is therefore an object of the present invention to provide propylene polymers allowing the production of fibers with increased tenacities.

Further, it is an object of the present invention to provide propylene polymers allowing the production of fibers with good elongational properties.

Furthermore, it is a particular object of the present invention to provide propylene polymers allowing the production of fibers with increased tenacities and good elongational properties.

An additional object of the present invention is to provide propylene polymers characterized by good processability in fiber spinning and nonwoven production.

BRIEF DESCRIPTION OF THE INVENTION

We have now discovered that at least one of the above objectives can be met by providing a propylene polymer with up to and including 1.0 wt %, relative to the total weight of the propylene polymer, of at least one comonomer, said propylene polymer being characterized by
- a melt flow index in the range from 3.0 to 8.0 dg/min, determined according to ISO 1133, condition L, 230° C., 2.16 kg,
- a xylene solubles content in the range from 1.0 wt % to 3.5 wt %, relative to the total weight of the propylene polymer,
- a polydispersity index of at least 3.0 and of at most 5.0,
- a content of mmmm pentads in the range from 97.0% to 99.0%, determined on the insoluble heptane fraction of the xylene insolubles fraction, and
- a recovery compliance in the range from $2.5 \cdot 10^{-4}$ $Pa^{-1}$ to $5.5 \cdot 10^{-4}$ $Pa^{-1}$.

Further, the present invention also discloses fibers, yarns and nonwovens comprising such a propylene polymer.

Additionally, the present invention provides a process for the production of the propylene polymer of any of claims 1 to 9 comprising the step of
(a) polymerizing propylene or polymerizing propylene and at least one comonomer in presence of a Ziegler-Natta polymerization catalyst, an aluminium alkyl, and hydrogen, said Ziegler-Natta polymerization catalyst comprising a titanium compound, which has at least one titanium-halogen bond, and an internal donor, both supported on magnesium halide in active form,
wherein the process is controlled so as to produce the propylene polymer with the properties as given above.

DETAILED DESCRIPTION OF THE INVENTION

For the purposes of the present invention, the terms "polypropylene" and "propylene polymer" may be used interchangeably.

For the purposes of the present invention, the terms "fiber" and "filament" may be used interchangeably.

For the purposes of the present invention, the term "propylene homopolymer" is used to denote a propylene polymer with up to, and including, 0.05 wt %, relative to the total weight of the propylene polymer, of at least one comonomer.

For the purposes of the present invention, the term "propylene random copolymer" is used to denote a propylene polymer with more than 0.05 wt %, for example from 0.051 wt %, up to, and including, 1.0 wt %, relative to the total weight of the propylene polymer, of at least one comonomer.

Throughout this application the melt flow index (MFI) of the propylene polymers is determined according to ISO 1133, condition L, at a temperature of 230° C. under a load of 2.16 kg.

We have now discovered that at least one of the objectives mentioned above can be met by providing a propylene polymer with from 0 wt % to 1.0 wt %, relative to the total weight of the propylene polymer, of at least one comonomer, said propylene polymer having a melt flow index (MFI) in a well-defined range in combination with other well-defined properties relating to the structure of the propylene polymer.

The propylene polymer of the present invention has up to and including 1.0 wt %, relative to the total weight of the propylene polymer, of at least one, preferably of a single, comonomer, i.e. the propylene polymer of the present invention has a comonomer content in the range from 0 wt % to 1.0 wt %, relative to the total weight of the propylene polymer. Preferably, said at least one comonomer is selected from the group of alpha-olefins having from 1 to 10 carbon atoms. More preferably, it is selected from the group consisting of ethylene, butene-1, pentene-1,4-methyl-pentene-1 and octene-1. Even more preferably, it is selected from ethylene and butene-1. Most preferably, it is ethylene.

The propylene polymer of the present invention has a melt flow index (MFI) in the range from 3.0 dg/min to 8.0 dg/min.

Further, the propylene polymer of the present invention is characterized by a xylene solubles content in the range from 1.0 wt % to 3.5 wt %, relative to the total weight of the propylene polymer. The xylene soluble content is determined by dissolving the propylene polymer in refluxing xylene, cooling the solution to 25° C., filtering the solution, and subsequently evaporating the solvent. The residue, which is the xylene soluble portion of the propylene polymer, is then dried and weighed.

The propylene polymer of the present invention is further characterized by a high isotacticity, for which the content of mmmm pentads is a measure. The content of mmmm pentads is in the range from 97.0% to 99.0%, preferably in the range from range from 97.1% to 98.5%, more preferably in the range from 97.2% to 98.3%. The content of mmmm pentads is determined on the heptane insoluble fraction of the xylene insoluble fraction by NMR analysis according to the method described by G. J. Ray et al. in Macromolecules, vol. 10, no 4, 1977, p. 773-778.

Furthermore, the propylene polymer of the present invention is characterized by a polydispersity index (PI) of at least 3.0, preferably of at least 3.5 and most preferably of at least 4.0. The present propylene polymer is characterized by a polydispersity index (PI) of at most 5.0, preferably of at most 4.8 and most preferably of at most 4.6. The polydispersity index (PI) has been described by Zeichner and Patel in the Proceedings of the $2^{nd}$ World Congress of Chemical Engineering, Montreal, Canada, 6, 373 (1981). The polydispersity index (PI) is defined as $$PI = 10^5 Pa \cdot G_C^{-1} \qquad (eq.\ 1)$$

with $G_C$, which is expressed in Pa, being the modulus at the intersection of the storage modulus G' and loss modulus G", i.e. $G_C$ is the modulus when G'=G". In the literature this intersection is often called "the cross-over point". Storage modulus G' and loss modulus G" can be obtained for a molten polymer sample from dynamic rheology measurement.

The propylene polymer of the present invention is also characterized by a recovery compliance in the range from $2.5 \cdot 10^{-4}$ Pa$^{-1}$ to $5.5 \cdot 10^{-4}$ Pa$^{-1}$. The recovery compliance is determined using a parallel-plate rotational stress rheometer. The recovery compliance is defined as the recoverable strain divided by the stress applied during the test. The recovery compliance therefore gives an indication of the purely elastic properties of the polymer.

First Preferred Embodiment

In a first preferred embodiment the present invention relates to a propylene polymer with up to, and including, 0.05 wt %, relative to the total weight of the propylene polymer, of at least one comonomer. Such a propylene polymer can be referred to as "propylene homopolymer". Said comonomer is selected as described previously in this application.

Said propylene homopolymer of the first preferred embodiment is preferably characterized by a melt flow index (MFI) in the range from 4.0 dg/min to 8.0 dg/min, more preferably in the range from 4.5 dg/min to 7.5 dg/min, and most preferably in the range from 5.0 dg/min to 7.0 dg/min.

Said propylene homopolymer of the first preferred embodiment is preferably characterized by a xylene solubles content in the range from 1.5 wt % to 3.5 wt %, more preferably in the range from 2.0 wt % to 3.0 wt % and most preferably in the range from 2.3 wt % to 2.8 wt %, relative to the total weight of said propylene homopolymer. The xylene solubles content is determined as described previously in the present application.

Said propylene homopolymer of the first preferred embodiment is preferably characterized by a recovery compliance in the range from $4.0 \cdot 10^{-4}$ Pa$^{-1}$ to $5.5 \cdot 10^{-4}$ Pa$^{-1}$, more preferably in the range from $4.5 \cdot 10^{-4}$ Pa$^{-1}$ to $5.5 \cdot 10^{-4}$ Pa$^{-1}$, and most preferably in the range from $4.6 \cdot 10^{-4}$ Pa$^{-1}$ to $5.4 \cdot 10^{-4}$ Pa$^{-1}$. The recovery compliance is determined as described in the test methods.

Second Preferred Embodiment

In a second preferred embodiment the present invention relates to a propylene copolymer with from more than 0.05 wt %, for example from 0.051 wt %, to 1.0 wt %, more preferably from 0.1 wt % to 0.8 wt %, and most preferably from 0.2 wt % to 0.5 wt %, relative to the total weight of the propylene polymer, of at least one comonomer. Such a propylene polymer can be referred to as "propylene random copolymer". Said comonomer is selected as described previously in this application.

Said propylene random copolymer of the second preferred embodiment is preferably characterized by a melt flow index (MFI) in the range from 3.0 dg/min to 6.0 dg/min, and most preferably in the range from 3.5 dg/min to 5.0 dg/min.

Said propylene random copolymer of the second preferred embodiment is preferably characterized by a xylene solubles content in the range from 1.5 wt % to 3.0 wt %, and most preferably in the range from 1.5 wt % to 2.5 wt %, relative to the total weight of the propylene random copolymer. The xylene solubles content is determined as described previously in the present application.

Said propylene random copolymer of the second preferred embodiment is preferably characterized by a recovery compliance in the range from $3.0 \cdot 10^{-4}$ Pa$^{-1}$ to $4.5 \cdot 10^{-4}$ Pa$^{-1}$, and most preferably in the range from $3.1 \cdot 10^{-4}$ Pa$^{-1}$ to $3.8 \cdot 10^{-4}$ Pa$^{-1}$. The recovery compliance is determined as described in the test methods.

The propylene polymer of the present invention may contain additives such as, by way of example, antioxidants, light stabilizers, acid scavengers, flame retardants, lubricants, antistatic additives, nucleating/clarifying agents, colorants. An overview of such additives may be found in Plastics Additives Handbook, ed. H. Zweifel, $5^{th}$ edition, 2001, Hanser Publishers.

The antioxidants used in the propylene polymer of the present invention preferably have anti-gas fading properties, i.e. they do not show, or only show a minimal degree of discoloration during melt processing of the propylene polymer. Thus, the preferred antioxidants are selected from the group consisting of phosphites, hindered phenols, hindered amine stabilizers and hydroxylamines. An example for a suitable antioxidant additivation is a blend of Irgafos 168 and Irganox 3114. Alternatively, phenol-free antioxidant additivations are suitable as well, such as for example those based on hindered amine stabilizers, phosphites, hydroxylamines or any combination of these. In general the antioxidants are added to the propylene homopolymer in an amount from 100 ppm to 2000 ppm with the exact amount depending upon the nature of the antioxidant, the processing conditions and other factors.

The propylene polymer as defined in the present application is produced in presence of a Ziegler-Natta polymerization catalyst, an aluminium alkyl, hydrogen and an optional external donor.

A Ziegler-Natta catalyst comprises a titanium compound, which has at least one titanium-halogen bond, and an internal donor, both supported on magnesium halide in active form.

The internal donor used in the present invention is a phthalate, a diether or a blend of these. Alternatively, the internal donor may also be a mixture of a phthalate, a diether or a blend of these two with one or more other suitable internal donors, provided that the polymerization behavior of a Ziegler-Natta catalyst with such a mixture of internal donors is comparable to that of a Ziegler-Natta catalyst with a phthalate, a diether or a blend of phthalate and diether.

Alternatively to a Ziegler-Natta catalyst comprising a mixture of internal donors as described above it is also possible to employ a mixture of a phthalate catalyst or a diether catalyst and one or more Ziegler-Natta catalysts comprising an internal donor other than a phthalate or a diether, provided that such a mixture shows a polymerization behavior that is comparable to that of a pure phthalate or diether catalyst or a blend of these.

The preferred internal donor comprises at least 80 wt % of a diether, preferably at least 90 wt %, more preferably at least 95 wt %, even more preferably at least 99 wt %, and most preferably the internal donor essentially consists of a diether.

Suitable phthalates are selected from the alkyl, cycloalkyl and aryl phthalates, such as for example diethyl phthalate, diisobutyl phthalate, di-n-butyl phthalate, dioctyl phthalate, diphenyl phthalate and benzylbutyl phthalate.

Particularly suited as internal donors are 1,3-diethers of formula

wherein $R^1$ and $R^2$ are the same or different and are $C_1$-$C_{18}$ alkyl, $C_3$-$C_{18}$ cycloalkyl or $C_7$-$C_{18}$ aryl radicals; $R^3$ and $R^4$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations. Ethers of this type are disclosed in published European patent applications EP-A-0 361 493 and EP-A-0 728 769. Representative examples of said diethers are 2-methyl-2-isopropyl-1,3-dimethoxypropane; 2,2-diisobutyl-1,3-dimethoxypropane; 2-isopropyl-2-cyclo-pentyl-1,3-dimethoxypropane; 2-isopropyl-2-isoamyl-1,3-dimethoxypropane; 9,9-bis(methoxymethyl)fluorene.

Ziegler-Natta catalysts comprising a phthalate or a diether as internal donor are well-known in the art and can for example be obtained by reaction of an anhydrous magnesium halide with an alcohol, followed by titanation with a titanium halide and reaction with a diether compound as internal donor. Such a catalyst comprises about 2-6 wt % of titanium, about 10-20 wt % of magnesium and about 5-30 wt % of internal donor with chlorine and solvent making up the remainder.

Ziegler-Natta catalysts comprising a phthalate or a diether as internal donor are for example commercially available for example from Basell under the Avant ZN trade name.

In the polymerization process of the present invention the external electron donor (ED) is optional. It is nevertheless preferred to perform the polymerization in presence of an external electron donor (ED). Suitable external electron donors (ED) include certain silanes, ethers, esters, amines, ketones, heterocyclic compounds and blends of these. It is preferred to use a 1,3-diether as described above or a silane. It is most preferred to use silanes of the general formula

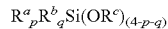

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$ Si(OCH$_3$)$_2$, (cyclohexyl)(methyl) Si(OCH$_3$)$_2$ (referred to as "C donor"), (phenyl)$_2$Si(OCH$_3$)$_2$ and (cyclopentyl)$_2$Si(OCH$_3$)$_2$ (referred to as "D donor"). Preferred silanes are (cyclohexyl)(methyl) Si(OCH$_3$)$_2$ (referred to as "C donor") and (cyclopentyl)$_2$Si(OCH$_3$)$_2$ (referred to as "D donor").

The organoaluminium compound used in the process of the present invention is triethyl aluminium (TEAL). Advantageously, the triethyl aluminium has a hydride content, expressed as AlH$_3$, of less than 1.0 wt % with respect to the triethyl aluminium. More preferably, the hydride content is less than 0.5 wt %, and most preferably the hydride content is less than 0.1 wt %. It would not depart from the scope of the invention if the organoaluminium compound contains minor amounts of other compounds of the trialkylaluminium family, such as triisobutyl aluminium, tri-n-butyl aluminium, and linear or cyclic alkyl aluminium compounds containing two or more Al atoms, provided they show polymerization behavior comparable to that of TEAL.

In the process of the present invention the molar ratio Al/Ti is not particularly specified. However, it is preferred that the molar ratio Al/Ti is at most 100.

If an external donor is present, it is preferred that the molar ratio Al/ED, with ED denoting external electron donor, is at most 120, more preferably it is in the range from 5 to 120, and most preferably in the range from 10 to 80.

Before being fed to the polymerization reactor the catalytic system preferably undergoes a premix and/or a prepolymerization step. In the premix step, the triethyl aluminium (TEAL) and the external electron donor (ED)—if present —, which have been pre-contacted, are mixed with the Ziegler-Natta catalyst at a temperature in the range from 0° C. to 30° C., preferably in the range from 5° C. to 20° C., for up to 15 min. The mixture of TEAL, external electron donor (if present) and Ziegler-Natta catalyst is pre-polymerized with propylene at a temperature in the range from 10° C. to 100° C., preferably in the range from 10° C. to 30° C., for 1 to 30 min, preferably for 2 to 20 min.

For the present invention the propylene polymer is preferably produced by polymerization in liquid propylene at temperatures in the range from 20° C. to 100° C. Preferably, temperatures are in the range from 60° C. to 80° C. The pressure can be atmospheric or higher. Preferably the pressure is between 25 and 50 bar.

Hydrogen is used to control the chain lengths of the propylene polymers. For the production of a propylene polymer with higher MFI, i.e. with lower average molecular weight and shorter polymer chains, the concentration of hydrogen in the polymerization medium needs to be increased. Inversely, the hydrogen concentration in the polymerization medium has to be reduced in order to produce a propylene polymer with lower MFI, i.e. with higher average molecular weight and longer polymer chains.

The production process for the propylene polymer of the present invention comprises the step of
(a) polymerizing propylene or polymerizing propylene and at least one comonomer in presence of a Ziegler-Natta polymerization catalyst, an aluminium alkyl and hydrogen in a polymerization reactor,
wherein the process is controlled so as to produce the propylene polymer as defined previously in the present application. Preferably, step (a) is conducted in presence of a Ziegler-Natta polymerization catalyst, an aluminium alkyl, hydrogen and an external electron donor.

Polymerization conditions, reactants' feed rates etc. are set in such a way as to result in the production of the propylene polymer with the properties mentioned above. This is well within the skills of the skilled person so that no further details need be given. After polymerization the propylene polymer is recovered as a powder. Said powder can then be pelletized or granulated.

The propylene polymer of the present invention is used to produce fibers and yarns. In particular, it is used to produce staple fibers and high-tenacity yarns. These may in turn be used in the manufacture of nonwovens. The methods used in the production of the fibers and yarns as well as the nonwovens are for example described in Polypropylene Handbook, ed. Nello Pasquini, 2nd edition, Hanser, 2005, pages 397-403.

The propylene polymer is melted in an extruder, optionally passed through a melt pump to ensure a constant feeding rate, and then extruded through a number of fine capillaries of a spinneret, thus obtaining molten fibers. Subsequently they are solidified. Preferably, the solidified fibers are re-heated to a temperature of 130° C. or less, drawn to a draw ratio of at least 2.5, and then annealed. In a preferred mode the annealed fibers are cut to a length in the range from 1.5 mm to 200 mm, preferably in the range from 10 mm to 100 mm. Such "cut fibers" are generally referred to as "staple fibers".

Staple fibers in general are produced either by the traditional spinning process or the compact spinning process. In the traditional spinning process staple fibers are produced in two steps. The first step includes fiber production, application of a spin finish to give certain desired properties to the fibers, and winding the undrawn fiber bundle or tow. The second step includes drawing of the fibers, optional application of a second spin finish, optional crimping or texturizing and cutting into staple fibers. The compact spinning, also called short spin, process is a one-step process, wherein fiber extrusion, drawing, and optional crimping or texturizing are performed in a single step.

The staple fibers produced in accordance with the present invention may subsequently be used to produce nonwovens. Preferably the production of nonwovens comprises the steps of carding, thus forming a web, which is then passed through a bonding step. Bonding of the web may be accomplished by thermobonding, hydroentanglement, needle punching, or chemical bonding. For geotextiles and nonwovens for automotive applications needle punching is preferred.

The nonwovens of the present invention are preferably geotextiles and nonwovens for automotive applications.

The fibers and yarns produced in accordance with the present invention are characterized by improved tenacity with respect to the prior art fibers and yarns. They are also characterized by improved elongational properties. In particular, the fibers and yarns of the present invention are characterized by an improved tenacity in combination with improved elongational properties. The fibers and yarns of the present invention are characterized by a tenacity at max of 45 cN/tex or higher and an elongation at break of 55% or more, or even of 65% or more, in order to be well suited for high tenacity fibers and nonwovens.

The improved properties of the fibers and yarns can be translated into equally improved properties of the nonwovens produced with the fibers and yarns of the present invention. Thus, the nonwovens according to the present invention are characterized by improved tenacity. They are also characterized by improved elongational properties. In particular, they are characterized by the combination of improved tenacity and improved elongational properties.

The present inventors have surprisingly found that the processability of the propylene polymer according to the present invention is on a level with the prior art propylene polymer regarding spinnability but is improved with regards to the drawing, i.e. a higher tenacity can be achieved at a lower draw ratio with the propylene polymer of the present invention.

Composites may be formed from two or more nonwovens, of which at least one is made in accordance with the present invention. Such composites may for example comprise further nonwovens, such as spunbond nonwovens (S) or melt blown nonwovens (M) or staple fiber nonwovens different from the ones of the present invention.

A first nonwoven or composite, said first nonwoven or composite being in accordance with the present invention, and a film may be combined to form a laminate. The film preferably is a polyolefin film. The laminate is formed by bringing the first nonwoven or composite and the film together and laminating them to one another for example by passing them through a pair of lamination rolls. The laminates may further include a second nonwoven or composite, which can be but need not be according to the present invention, on the face of the film opposite to that of the first nonwoven or composite. In a preferred embodiment, the film of the laminate is a breathable polyolefin film, thus resulting in a laminate with breathable properties.

The propylene polymer of the present invention may also be part of a composition that is used to produce fibers and nonwovens as described above. It is preferred that the propylene polymer of the present invention comprise at least 50 wt %, preferably at least 75 wt % and most preferably at least 90 wt % of such composition. Preferably, the other components of the composition are other polyolefins, such as for example propylene homopolymers, which may or may not be according to the present invention, propylene random copolymers, which may or may not according to the present invention, polyethylene and the likes.

Test Methods

The melt flow index was measured according to ISO 1133, condition L, using a weight of 2.16 kg and a temperature of 230° C.

Xylene solubles (XS) were determined as follows: Between 4.5 and 5.5 g of propylene polymer were weighed into a flask and 300 ml xylene were added. The xylene was heated under stirring to reflux for 45 minutes. Stirring was continued for 15 minutes exactly without heating. The flask was then placed in a thermostated bath set to 25° C.+/−1° C. for 1 hour. The solution was filtered through Whatman no 4 filter paper and exactly 100 ml of solvent were collected. The solvent was then evaporated and the residue dried and weighed. The percentage of xylene solubles ("XS") was then calculated according to XS (in wt %)=(Weight of the residue/Initial total weight of PP)*300 with all weights being in the same units.

Heptane insolubles were isolated as follows: The xylene insoluble fraction (see above) was dried in air for a minimum of 3 days and manually ground into small pieces, of which ca. 2 g are weighed into the extraction thimble of a Soxleth extractor and extracted with heptane under reflux for 15 hours. The heptane insoluble fraction is recovered from the thimble, and dried in air for a minimum of 4 days.

The polymer index (PI) is given as $PI=10^5 \ Pa \cdot G_C^{-1}$. $G_C$ is the cross-over modulus in Pascal determined at 230° C. using a dynamic rheometer in frequency sweep with a strain of 20% on an ARES from Tainstrument, branch of WATERS.

The isotacticity (mmmm %) is determined by NMR analysis according to the method described by G. J. Ray et al. in Macromolecules, vol. 10, no 4, 1977, p. 773-778. It is performed on the dried product resulting of the extraction by boiling heptane of the xylene insoluble PP fraction.

The recovery compliance is determined at a temperature of 210° C. using a parallel-plate rotational stress rheometer. The sample is contained between two coaxial parallel discs in an oven filled with nitrogen. The test consists of monitoring the strain response when the stress has been deleted after a creep test. For the creep test a stress of 600 Pa is applied. Then the recovery compliance is the recoverable strain divided by the stress applied during the creep.

Fiber tenacity and elongation were measured at 23° C. on a Textechno Statimat ME according to norm ISO 5079:1995 with a testing speed of 250 mm/min.

Tensile strength and elongation of the nonwoven were measured at 23° C. according to ISO 9073-3:1989 at 23° C.

EXAMPLES

The advantages of the propylene polymer of the present invention over those of the prior art are illustrated by the following examples.

Propylene Polymers

The propylene polymers of Example 1 and Example 2 were produced using a Ziegler-Natta polymerization catalyst with a diether as internal electron donor. The propylene polymer of Comparative Example 1 was produced using a Ziegler-Natta polymerization catalyst with a phthalate as internal electron donor. For Examples 1 and 2 as well as comparative example 1 the same silane was used as external donor (ED); triethylaluminum was used as co-catalyst. To obtain the desired melt flow index for the propylene polymer hydrogen was used to control the molecular weight. Further polymerization conditions and polymer properties are indicated in Table 1.

TABLE 1

|  | Unit | Ex. 1 | Ex. 2 | Comp. ex. 1 |
| --- | --- | --- | --- | --- |
| Catalyst activation |  |  |  |  |
| Al/ED | g/g | 13 | 13 | 65 |
| Polymerization |  |  |  |  |
| Temperature | ° C. | 72 | 72 | 71 |

TABLE 1-continued

|  | Unit | Ex. 1 | Ex. 2 | Comp. ex. 1 |
| --- | --- | --- | --- | --- |
| Polymer properties |  |  |  |  |
| MFI | dg/min | 3.9 | 3.9 | 7.2 |
| $C_2$ content | wt % | 0 | 0.4 | 0 |
| Xylene solubles | wt % | 2.5 | 2.0 | 4.9 |
| Isotacticity | % mmmm | 97.5 | 97.9 | 96.9 |
| PI |  | 4.0 | 3.8 | 4.6 |
| $M_w/M_n$ |  | 6.6 | 6.3 | 7.4 |
| Recovery compliane | $10^{-4} \ Pa^{-1}$ | 3.4 | 3.2 | 5.4 |

Fiber Spinning

The propylene polymers of Examples 1 and 2 as well as of Comparative Example 1 were spun into fibers on a Busschaert fiber spinning pilot line equipped with two circular dies of 112 holes each of a diameter of 0.3 mm and an L/D ratio of 3.2. The melt temperature was kept at 280° C. The filaments were drawn over two godets with the temperature of the first being 80° C. and the temperature of the second being 90° C. Draw ratio was between 3 and 5. The targeted fiber titer was in the range from 5 to 7 dtex per filament. This was achieved by keeping the winder speed after the drawing step at a constant speed of 1200 m/min and adapting the take-up speed, i.e. the speed at which the fibers are collected directly after melt spinning. The respective draw ratios and the fiber properties are indicated in table 3.

TABLE 3

|  | Unit | Ex. 1 | Ex. 2 | Comp. ex. 1 |
| --- | --- | --- | --- | --- |
| Max. draw ratio | dtex | 3.2 | 3.2 | 4.6 |
| Tenacity at max | cN/tex | 52 | 51 | 46 |
| Elongation at break | % | 70 | 71 | 78 |

Examples 1 and 2 demonstrate the advantages of the propylene polymers of the present invention by allowing to obtain a higher tenacity with a lower draw ratio, thus showing that they have improved processability as well as improved mechanical properties when compared to the propylene polymer of Comparative Example 1.

In conclusion it was found that the propylene polymers of the present invention allow the production of fibers with the desired combination of tenacity and elongational properties.

The invention claimed is:

1. A propylene polymer with up to and including 1.0 wt %, relative to the total weight of the propylene polymer, of at least one comonomer selected from the group of alpha-olefins consisting of ethylene, butane-1, pentene-1,4-methyl-pentene-1 and octene-1, said propylene polymer comprising:
    a melt flow index in the range from 3.0 to 8.0 dg/min, determined according to ISO 1133, condition L, 230° C., 2.16 kg,
    a xylene solubles content in the range from 1.0 wt % to 3.5 wt %, relative to the total weight of the propylene polymer,
    a polydispersity index of at least 3.0 and of at most 5.0,
    a content of mmmm pentads in the range from 97.0% to 99.0%, determined on the insoluble heptane fraction of the xylene insolubles fraction, and
    a recovery compliance in the range from $2.5 \cdot 10^{-4} \ Pa^{-1}$ to $5.5 \cdot 10^{-4} \ Pa^{-1}$.

2. The propylene polymer according to claim 1 with up to and including 0.05 wt %, relative to the total weight of the propylene polymer, of at least one comonomer selected from the group of alpha-olefins consisting of ethylene, butene-1, pentene-1, 4-methyl-pentene-1 and octene-1.

3. The propylene polymer according to claim 2, wherein the melt flow index is in the range from 4.0 dg/min to 8.0 dg/min, determined according to ISO 1133, condition L, at 230° C. and 2.16 kg.

4. The propylene polymer according to claim 2, wherein the xylene solubles content is in the range from 1.5 wt % to 3.5 wt %, relative to the total weight of the propylene polymer.

5. The propylene polymer according to claim 2, wherein the recovery compliance is in the range from $4.0 \cdot 10^{-4}$ $Pa^{-1}$ to $5.5 \cdot 10^{-4}$ $Pa^{-1}$.

6. The propylene polymer according to claim 1, with from more than 0.05 wt % to 1.0 wt %, relative to the total weight of the propylene polymer, of at least one comonomer selected from the group of alpha-olefins consisting of ethylene, butene-1, pentene-1, 4-methyl-pentene-1 and octane-1.

7. The propylene polymer according to claim 6, wherein the melt flow index is in the range from 3.0 dg/min to 6.0 dg/min, determined according to ISO 1133, condition L, at 230° C. and 2.16 kg.

8. The propylene polymer according to claim 6, wherein the xylene solubles content is in the range from 1.5 wt % to 3.0 wt %, relative to the total weight of the propylene polymer.

9. The propylene polymer according to claim 6, wherein the recovery compliance is in the range from $3.0 \cdot 10^{-4}$ $Pa^{-1}$ to $4.5 \cdot 10^{-4}$ $Pa^{-1}$.

10. Fibers or yarns comprising the propylene copolymer of claim 1.

11. Nonwovens comprising the fibers of claim 10.

12. A process for the production of the propylene polymer comprising the step of
    (a) polymerizing propylene or polymerizing propylene and at least one comonomer in presence of a Ziegler-Natta polymerization catalyst, an aluminium alkyl, and hydrogen, said Ziegler-Natta polymerization catalyst comprising a titanium compound, which has at least one titanium-halogen bond, and an internal donor, both supported on magnesium halide in active form,
    wherein the process is controlled so as to produce propylene polymer with:
        1.0 wt %, relative to the total weight of the propylene polymer, of at least one comonomer; consisting of ethylene, butane-1, pentene-1,4-methyl-pentene-1 and octane-1;
        a melt flow index in the range from 3.0 to 8.0 dg/min, determined according to ISO 1133, condition L, 230° C., 2.16 kg;
        a xylene solubles content in the range from 1.0 wt % to 3.5 wt %, relative to the total weight of the propylene polymer;
        a polydispersity index of at least 3.0 and of at most 5.0;
        a content of mmmm pentads in the range from 97.0% to 99.0%, determined on the insoluble heptane fraction of the xylene insolubles fraction; and
        a recovery compliance in the range from $2.5 \cdot 10^{-4}$ $Pa^{-1}$ to $5.5 \cdot 10^{-4}$ $Pa^{-1}$.

13. The process according to claim 12, wherein the Ziegler-Natta polymerization catalyst has an internal electron donor that comprises at least 80 wt % of a diether.

14. The process according to any of claim 12, further comprising the steps of
    (b) melting the propylene copolymer obtained in step (a) in an extruder,
    (c) extruding the molten propylene copolymer of step (b) from a number of fine capillaries of a spinneret, thus obtaining molten fibers, and
    (d) subsequently solidifying the fibers of step (c).

15. The process according to claim 14, further comprising the steps of
    (e) re-heating the solidified fibers of step (d) to a temperature of 130° C. or less,
    (f) drawing said re-heated fibers of step (e) with a draw ratio of at least 2.5, and
    (g) annealing said drawn fibers obtained in step (f).

16. The propylene polymer according to claim 1, wherein the melt flow index is in the range from 4.5 dg/min to 7.5 dg/min, determined according to ISO 1133, condition L, at 230° C. and 2.16 kg.

17. The propylene polymer according to claim 1, wherein the melt flow index is in the range from 5.0 dg/min to 7.0 dg/min, determined according to ISO 1133, condition L, at 230° C. and 2.16 kg.

* * * * *